Patented Dec. 13, 1932

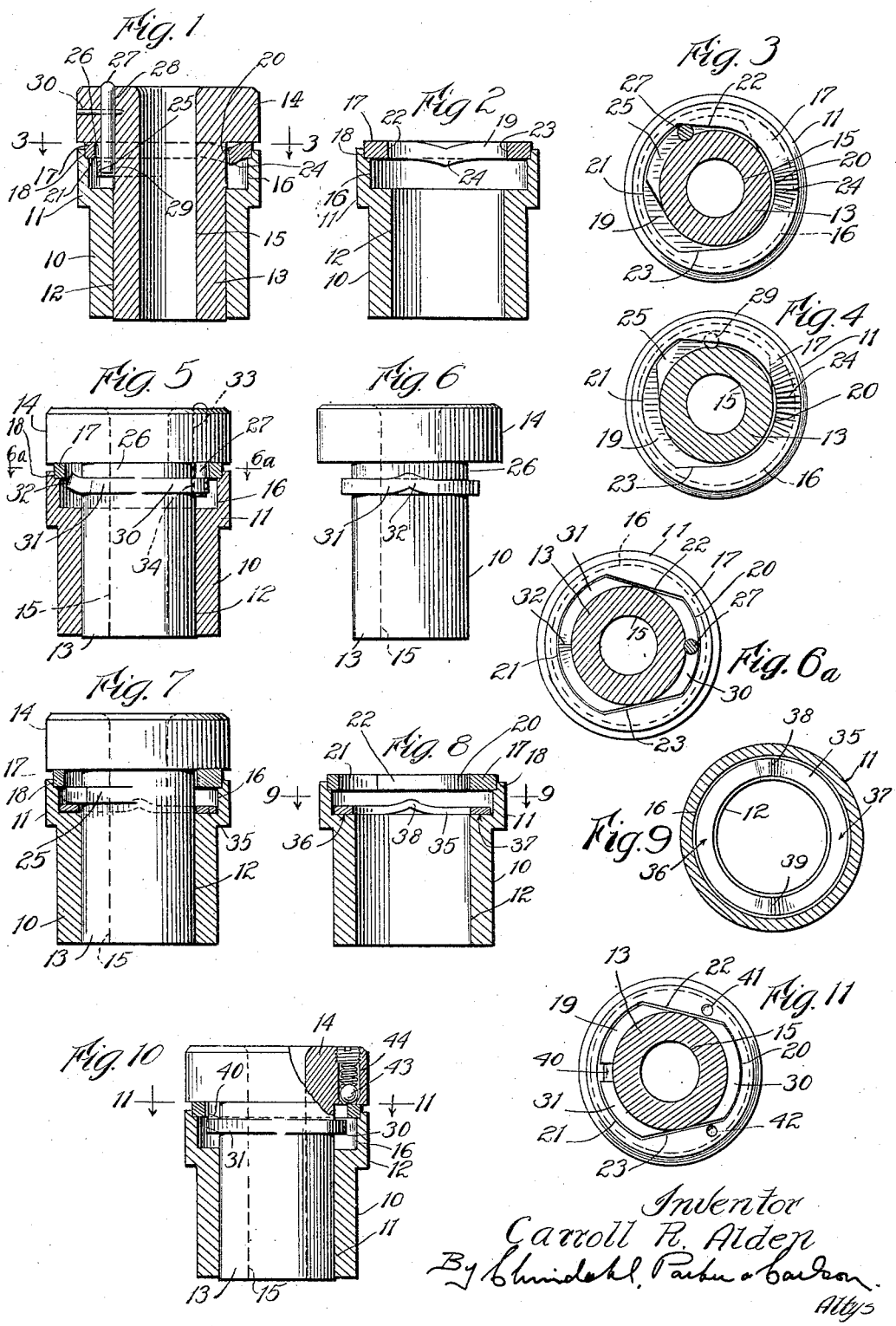

1,890,664

UNITED STATES PATENT OFFICE

CARROLL R. ALDEN, OF DETROIT, MICHIGAN, ASSIGNOR TO EX-CELL-O AIRCRAFT & TOOL CORPORATION, OF DETROIT, MICHIGAN, A CORPORATION OF MICHIGAN

SLIP BUSHING

Application filed July 12, 1929. Serial No. 377,690.

The present invention relates to improvements in slip bushings, and has particular reference to new and improved lock means therefor.

Slip bushings commonly comprise a liner mounted in a suitable support, such as a jig, and a bushing mounted therein. Lock means is provided to secure the bushing removably in the liner. Plain bushings which are not to be removed until worn out may be locked firmly in place. Bushings that are intended to be removed frequently, as for example to accommodate different sizes of tools, preferably are held in place by means of a free lock, i. e. an interlock serving to prevent withdrawal or rotation of the bushing without wedging or clamping the latter tightly in position. In some instances, the bushings are not held against endwise movement or rotation so that they will be crowded out of the liner by accumulating metal chips as the cutting operation progresses. One objectionable feature of this form is that the rotation of the bushing with the tool causes wear on the liner, the replacement of which is costly.

Slip bushings provided heretofore have been objectionable in that they are not convertible from one form into another, thereby necessitating a full stock of each form, and frequent replacement of the liner. Prior lock bushings also have been subject to the objections that they do not effect the desired locking action, nor possess sufficient strength to prevent failure of the metal when subjected to heavy duty, and are movable only in one direction to effect the lock.

An important object of the invention therefore resides in the provision of a novel slip bushing having lock means which may be turned in either direction to effect the locking action, thereby increasing its range of usefulness, and which is readily convertible from a "free lock" to a "tight lock" and vice versa without replacement or mutilation of either the liner or the bushing.

A further object is to provide a new and improved slip bushing which is simple, compact, sturdy and inexpensive in construction, which will withstand heavy stresses without failure of the locking parts, and which has an effective locking action.

Further objects and advantages will become apparent as the description proceeds.

In the accompanying drawing:

Figure 1 is an axial sectional view of a slit bushing embodying the features of my invention.

Fig. 2 is an axial sectional view of the liner taken at right angles to Fig. 1.

Fig. 3 is a horizontal sectional view taken along line 3—3 of Fig. 1 and showing the parts in one "free-lock" position.

Fig. 4 is a view similar to Fig. 3, but showing the parts in one of the "tight-lock" positions.

Fig. 5 is a view similar to Fig. 1 of a modified form of the invention, the bushing being shown in elevation.

Fig. 6 is a side elevational view of the bushing shown in Fig. 5, the view being taken at right angles to that in Fig. 5.

Fig. 6$^a$ is a sectional view taken along line 6$^a$—6$^a$ of Fig. 5.

Fig. 7 is a view similar to Fig. 5 but of another modified form of the invention.

Fig. 8 is an axial sectional view of the liner shown in Fig. 7.

Fig. 9 is a sectional view taken along line 9—9 of Fig. 8.

Fig. 10 is a view similar to Fig. 7 but of still another modified form of the invention.

Fig. 11 is a sectional view taken along line 11—11 of Fig. 10.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the slip bushing shown in Figs. 1 to 4 comprises a suitable liner 10 which preferably is cylindrical in form, and the upper end of which is provided with a peripheral head 11. The liner 10 is adapted to be seated and secured in a suitable support, such as a jig (not shown), and in use is intended to be a more or less permanent fitting, i. e., is not intended to be frequently replaced, or to be replaced until necessary because of wear. Replacement of the liner obviously involves expense and hence the reduction of wear is an important consideration.

The liner 10 is formed with a central axial bore 12 adapted to receive a cylindrical bushing 13 with a snug sliding fit. The bushing 13 is provided with a head 14 overlying the head 11, and is formed with an axial bore 15 opening therethrough for the reception in use of a tool (not shown).

Self-contained means is provided for locking the bushing 13 in the liner 10 against rotational or axial movement. To this end, the head 11 is formed with a counterbore 16 in axial alinement with the bore 12. The upper end of the bore 16 is partially closed by a peripherally overhanging flange or ledge which preferably is defined by a top locking plate 17. In the present instance, the top plate 17 is separate from the liner 10, and is rigidly secured, as for example by welding, in an inner peripheral notch 18 formed in the upper edge of the bore 16.

Formed in the top plate 17 is an opening 19 for permitting the insertion and removal of the bushing 13. While the opening 19 may be of any suitable shape, in the present instance it is defined by two diametrically opposed arcuate marginal surfaces 20 and 21 joined at the ends by two opposed straight marginal surfaces 22 and 23. The surfaces 20 and 21 are concentric with respect to the axis of the bushing 13, the surface 20 being struck on a radius slightly larger than the outer radius of the bushing, and the surface 21 being struck on a radius slightly smaller than that of the counterbore 16. Preferably, the surfaces 22 and 23 diverge slightly toward the surface 21. Formed on the underside of the plate 17 at a point diametrically opposed to the surface 21 is a locking cam 24. Preferably, the cam 24 is formed by stamping or denting the metal of the plate 17 downwardly. The opposite sides of the cam 24 thus slope gradually to the plane of the plate 17, and constitute inclined cam or wedge surfaces for effecting a "tight-lock" as will be more apparent hereinafter.

Formed on the periphery of the bushing 13 in parallel spaced relation to the head 14 is a flat lateral flange or projection 25. Preferably, the free end surface of the flange 25 is arcuate, being struck about the axis of the bushing 13 on a radius slightly less than that of the surface 21, and the side surfaces are substantially parallel and tangent to opposite sides of the bushing. The head 11 and the flange 25 define a space 26 adapted to receive the inner margin of the plate 17 with a close sliding fit. It will be evident that to insert or remove the bushing 13, the latter must first be so positioned that the flange 25 is in registration with the opening defined by the surface 21, and that after insertion of the bushing, rotation thereof in either direction will bring the flanges 25 into underlapping relation with the inner margin of the plate 17 to hold the bushing against relative endwise movement. Upon continued rotation of the bushing 13, one of the upper side edges of the flange 25 will move into engagement with one of the sloping sides of the cam 24 to effect a "tight-lock" of the bushing in the liner. It will be evident that a "tight-lock" may be obtained by rotation of the bushing 13 in either direction. This type of lock is mainly used where the bushing is not subject to frequent replacement for different kinds of work.

When frequent replacement of the bushing is necessary, it is desirable to provide a "free-lock" in place of a "tight-lock". In the present instance, this is accomplished without change or reconstruction of the lock bushing as a whole, and to this end a suitable stop or abutment, preferably in the form of a pin 27, is provided in the space 26 directly over the center of the flange 25. The pin 27 is removably inserted with a tight fit through alined apertures 28 and 29 in the head 14 and the flange 25 respectively, and may be held in place by friction or by means of a key 30. It will be evident that upon rotation in either direction, the pin 27 will be moved into abutting engagement with one or the other of the surfaces 22 and 23, thereby permitting the flange 25 to move into underlapping relation with the plate 17, but preventing rotation of the flange into tight locking engagement with he cam 24. The pin 27 engages the plate 17 at a non-locking angle. In either the "tight-lock" arrangement, in which the pin 27 is removed, or in the "free-lock" arrangement, in which the pin 27 is inserted, the bushing 13 is held against continued rotation in the liner 10, thereby protecting the latter against excessive wear.

In some instances slip bushings are desired in which the bushing is free to move endwise under the influence of collecting metal chips resulting from the machine operation. The present bushing is adapted for conversion at minimum expense and trouble into this form when desired without altering the permanent liner or destroying its usefulness as part of a locking bushing. When so converted, the bushing 13 still is held against rotation with the tool, thereby preventing excessive wear on the liner 10. All that is necessary to accomplish this is to grind off or remove the flange 25. The pin 27, however, is left in position to provide a "free-lock" against rotation of the bushing 13, but not against axial motion relative to the liner 10.

In general, it will be evident that I have provided a novel slip bushing which has a wide range of usefulness and adaptability. It may be used as a "tight-lock" bushing. It may be converted into a "free-lock" bushing without any mutilation of parts, merely by inserting the pin 27, and may be reconverted into the "tight-lock" form by removing the pin. End retainment may also be eliminated by merely removing the flange 25, thereby making it possible to effect an emergency replacement in this form. The same liner is suitable for each form. As a result, users desiring a stock of these different forms need not carry a large variety of parts, and need not suffer the expense of frequently removing the liner 10. Since the bushing will "free-lock" or "tight-lock" upon rotation in either direction, it is fool-proof and adapted for a wide range of machine operations. The construction is sturdy, simple, compact and relatively inexpensive.

The different forms of the invention shown in the drawing have numerous structural details in common, and like parts are therefore designated by the same reference characters throughout the views.

In the modified form of the invention shown in Figs. 5 and 6, the top locking plate 17 is not formed with a cam 24, and its opening 19 is the same in general contour as in Fig. 3 with the exception that the surface 20 is struck on the same arc as the surface 21 but is shorter in length than the surface 21. In this form, the bushing 13 has two diametrically opposed flanges 30 and 31 instead of the flange 25, and these two flanges conform substantially in shape to that of the opening 19. The flange 31 is struck upwardly intermediate its ends to form a cam 32 having sloping sides adapted to move selectively into locking engagement with the side surfaces of the opening 19. The abutment or pin 27 is adapted to be removably secured in vertically alined openings 33 and 34 formed respectively in the head 14 and the flange 30 for selective engagement with the sides of the opening 19 to provide a "free-lock". Since the surface 20 is shorter than the surface 21, the pin 27 when in position, will engage the plate 17 before the cam 32 can move into locking engagement therewith.

In the form of the invention shown in Figs. 7 to 9, the top plate 17 is formed in the same manner as in Fig. 1 with the exception that the locking cam 24 is not provided. The bushing together with the flange 25 also is constructed in the same manner as in Fig. 1. Instead of the cam 24, a resilient locking ring 35 is rigidly secured in the counterbore 16. Preferably, the ring 35 is rigidly secured, as by welding, at diametrically opposed points 36 and 37 to the bottom of the counterbore 16. The ring 35 also is upset at diametrically opposed points between the points 36 and 37 and below the overhanging part of the plate 17 to form cams 38 and 39 for selective locking engagement with opposite sides of the flange 25 upon rotation of the bushing 13 in opposite directions.

In the form of the invention shown in Figs. 10 and 11, the top plate 17 and the bushing 13, together with the flanges 30 and 31, are formed in the same manner as in Figs. 5 and 6. To provide means for effecting a "free-lock", the central portion of the flange 31 is struck up to form a tongue 40 adapted to move selectively into abutting engagement with opposite sides of the opening 19. Formed in opposite sides in the top of the plate 17 are two spaced recesses or depressions 41 and 42. A spring pressed ball 43 housed in a bore 44 in the underside of the head 14 is arranged for selective engagement in the depressions 41 and 42 when the tongue 40 is in engagement with either side of the hole 19 to hold the bushing 13 yieldingly in either free-locking position.

I claim as my invention:

1. A slip bushing comprising, in combination, a liner having a bore opening therethrough and having an enlarged recess at one end of said bore, a locking ledge overhanging said recess and having a flat inner surface, said ledge defining an opening in registration with said bore, a bushing slidably and rotatably disposed in said bore and having a head bearing over the outside of said ledge, one side of said opening being offset to define a space at one side of said bushing, a cam projection formed on the said inner surface of said ledge, and a locking projection on one side of said bushing movable through said space, and also rotatable in either direction out of registration with said space into wedge locking engagement with said cam projection.

2. A slip bushing comprising, in combination, a liner having a central bore opening therethrough, an enlarged recess in said liner at one end of said bore, a ledge overhanging the outer end of said recess and defining an opening in registration with said bore, said opening having an offset portion defining spaced peripheral abutment surfaces, a bushing slidably and rotatably mounted in said bore and having a head disposed over said ledge, a lateral projection on said bushing, said projection being movable through said offset space into said recess and being rotatable out of registration with said space in either direction into locking engagement with said ledge, and stop means removably mounted on said bushing over said projection, said stop means when in position being movable into selective abutting engagement with said abutment surfaces to prevent rotation of said projection into locking engagement with said ledge.

3. A slip bushing comprising, in combination, a liner having a bore opening therethrough and having a head on one end, said bore being counterbored in said head, a locking plate rigidly secured to the outer end of said head over the outer end of said counterbore, said plate being formed with an opening defined by two diametrically opposed arcuate surfaces joined at their ends by straight surfaces, and defining an overhanging ledge along said straight surfaces, one arcuate surface defining a space offset to said bore, a cam formed on the underside of said plate diametrically opposite said last mentioned arcuate surface, a bushing slidably and rotatably mounted in said bore and having a head on one end seated against the outside of said plate, and a locking flange formed on one side of said bushing in parallel spaced relation to said head, said head and said flange defining a space adapted to receive the inner peripheral margin of said plate upon rotation of said flange in either direction away from said last mentioned arcuate surface, said flange being adapted for selective engagement with either side of said cam to effect a tight lock of said bushing in said liner.

4. A slip bushing comprising, in combination, a liner having a bore opening therethrough and having a head on one end, said bore being counterbored in said head, a locking plate rigidly secured to said head over the outer end of said counterbore, said plate being formed with an opening defined by two diametrically opposed arcuate surfaces joined at their ends by straight surfaces, one arcuate surface being struck on a radius slightly larger than that of said bore and the other arcuate surface being struck on a radius slightly less than that of the counterbore and being substantially longer than said first mentioned arcuate surface, a cam formed on the underside of said plate diametrically opposite said last mentioned arcuate surface, a bushing slidably and rotatably mounted in said bore and having a head on one end seated against the outside of said plate, an arcuate flange formed on one side of said bushing in parallel spaced relation to said head and struck on a radius slightly less than that of said larger arcuate surface, said head and said flange defining a space adapted to closely receive the inner peripheral margin of said plate upon rotation of said bushing in either direction, said flange being adapted for selective engagement with either side of said cam to effect a tight lock of said bushing in said liner, and a pin adapted to be extended through said head to the center of said flange, said pin when in position being adapted for abutting engagement with opposite sides of said opening to effect a free lock of said bushing in said liner and to prevent said tight lock between said flange and said cam.

5. A slip bushing comprising, in combination, a liner having a central bore and having a head on one end formed with a counterbore, a ledge overhanging the outer end of said counterbore, said ledge having an opening in registration with said bore and formed with an offset space defining opposite spaced abutments, a bushing slidably and rotatably mounted in said bore, and having an extension insertible through the offset space and engageable under the ledge by turning the bushing, and abutment means on said bushing movable upon rotation of said bushing in either direction into selective free-locking engagement with said abutments.

6. A slip bushing comprising, in combination, a liner having a bore opening therethrough and having a cylindrical counterbore at one end of said bore, and having a flat inner surface, a locking flange overhanging said counterbore, said flange defining an opening in registration with said bore, a bushing slidably and rotatably disposed in said bore and having a head bearing against the outside of said flange, one side of said opening being offset to define a space at one side of said bushing, the sides of said space defining opposed abutments, a locking projection on one side of said bushing movable endwise through said space, a cam projection formed on the top of said locking projection, said locking projection being rotatable in either direction out of registration with said space into underlapping relation with said flange to move said cam projection selectively into wedging engagement with one or the other of said abutments.

7. A slip bushing comprising, in combination, a liner having a bore opening therethrough and having a cylindrical counterbore at one end of said bore, a locking flange overhanging said counterbore and having a flat inner surface, said flange defining an opening in registration with said bore, a bushing slidably and rotatably disposed in said bore and having a head bearing against the outside of said flange, one side of said opening being offset to define a space at one side of said bushing, the sides of said space defining opposed abutments, a locking projection on one side of said bushing having a flat upper surface and movable endwise through said space, a cam projection formed on the said upper surface of said locking projection, said locking projection being rotatable in either direction out of registration with said space into underlapping relation with said flange to move said cam projection selectively into wedging engagement with either of said abutments, and a stop member adapted to be mounted on said bushing between said head and said locking projection for movement into abutting engagement with either of said abutments to hold said cam projection out of engagement with said abutments.

8. A slip bushing comprising, in combination, a liner having a bore opening therethrough and having a counterbore at one end, a locking ledge overhanging said counterbore, said ledge defining an opening with two diametrically opposed arcuate margins concentric with respect to said bore and with connecting margins defining opposite flanges, a bushing slidably and rotatably disposed in said bore and having a head bearing against the outside of said ledge, two diametrically opposed projections on said bushing movable endwise through said opening into said counterbore and rotatable in either direction out of registration with said opening into underlapping relation with said flanges, a cam projection formed on one of said projections for movement into wedging engagement with either of said flanges, and a stop member removably mounted on the other of said projections for movement into abutting engagement with said flanges to prevent movement of said cam projection into engagement with said flanges.

9. A slip bushing comprising, in combination, a liner having a bore opening therethrough, one end of said bore being cylindrically counterbored, a locking plate having a flat inner surface over the outer end of said counterbore, said plate being formed with an opening in registration with said bore, a bushing slidably and rotatably disposed in said bore and having a head bearing against the outside of said plate, said opening being enlarged at one side to form an offset space, a cam projection formed on the said inner face of said plate opposite said space, and a locking flange having a flat upper face, with straight side edges on one side of said bushing in parallel spaced relation to said head and movable out of registration with said space into wedge-locking engagement with said projection.

In testimony whereof, I have hereunto affixed my signature.

CARROLL R. ALDEN.

CERTIFICATE OF CORRECTION.

Patent No. 1,890,664.                                                                       December 13, 1932.

CARROLL R. ALDEN.

It is hereby certified that error appears in the printed specification of the above numbered patent requiring correction as follows: Page 4, lines 83 and 84, claim 6, strike out the words "and having a flat inner surface" and insert the same after "counterbore" in line 85; and that the said Letters Patent should be read with this correction therein that the same may conform to the record of the case in the Patent Office.

Signed and sealed this 14th day of February, A. D. 1933.

(Seal)                                                                           M. J. Moore,
                                                                                Acting Commissioner of Patents.